(12) United States Patent
Ohgi et al.

(10) Patent No.: US 8,182,949 B2
(45) Date of Patent: May 22, 2012

(54) POLYMER ELECTROLYTE MEMBRANE AND PROCESS FOR PREPARATION THEREOF, AND MEMBRANE-ELECTRODE ASSEMBLY AND POLYMER ELECTROLYTE FUEL CELL

(75) Inventors: Hiroyuki Ohgi, Tsukuba (JP); Tomohiro Ono, Tsukuba (JP); Shinji Nakai, Tsukuba (JP); Takeshi Nakano, Tsukuba (JP); Takeshi Kusudou, Kurashiki (JP); Naoki Fujiwara, Tokyo (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 422 days.

(21) Appl. No.: 12/523,814

(22) PCT Filed: Jan. 11, 2008

(86) PCT No.: PCT/JP2008/050274
§ 371 (c)(1),
(2), (4) Date: Jul. 22, 2009

(87) PCT Pub. No.: WO2008/090774
PCT Pub. Date: Jul. 31, 2008

(65) Prior Publication Data
US 2010/0098997 A1    Apr. 22, 2010

(30) Foreign Application Priority Data
Jan. 23, 2007   (JP) .................. 2007-012738

(51) Int. Cl.
H01M 6/18      (2006.01)
H01M 10/0562   (2010.01)
H01M 8/10      (2006.01)
H01G 9/02      (2006.01)

(52) U.S. Cl. ........ 429/317; 429/306; 429/303; 429/304; 429/189; 429/188; 429/491; 252/62.2

(58) Field of Classification Search .................. 429/317, 429/306, 303, 304, 189, 188, 491; 252/62.2
See application file for complete search history.

(56) References Cited

U.S. PATENT DOCUMENTS
5,409,785 A     4/1995  Nakano et al.
2001/0041279 A1  11/2001 Terahara et al.
2004/0081892 A1  4/2004  Sawa
2005/0031928 A1  2/2005  Ishizone et al.
2008/0014505 A1  1/2008  Kato et al.
2008/0113244 A1  5/2008  Yamashita et al.
2009/0123804 A1  5/2009  Yamashita et al.

FOREIGN PATENT DOCUMENTS

| | | |
|---|---|---|
| JP | 59 189113 | 10/1984 |
| JP | 59-189113 | 10/1984 |
| JP | 1 186767 | 7/1989 |
| JP | 1-186767 | 7/1989 |
| JP | 5-174856 | 7/1993 |
| JP | 6-76838 | 3/1994 |
| JP | 6-199935 | 7/1994 |
| JP | 6 199935 | 7/1994 |
| JP | 11 329062 | 11/1999 |
| JP | 1 091 435 A1 | 4/2001 |
| JP | 2001 250567 | 9/2001 |
| JP | 2004-146208 | 5/2004 |
| JP | 2005 54170 | 3/2005 |
| JP | 2006-273890 | 10/2006 |
| JP | 2006 273890 | 10/2006 |

OTHER PUBLICATIONS

Kentaro Hatemura, et al., "Solid Polymer Electrolytes prepared from Poly (vinyl alcohol) and Polyanion for Direct Methanol Fuel Cell", Polymer Preprints, vol. 54, No. 1, 2005, p. 1755, with English Abstract.
U.S. Appl. No. 12/444,461, filed Apr. 6, 2009, Kato, et al.
U.S. Appl. No. 12/162,375, filed Jul. 28, 2008, Ono, et al.
U.S. Appl. No. 12/278,794, filed Aug. 8, 2008, Ono, et al.
U.S. Appl. No. 12/526,276, filed Aug. 7, 2009, Nakai, et al.
Kiyoshi Koyama et al.—"An Interpolymer Anionic Composite Reverse Osmosis Membrane Derived from Poly(vinyl Alcohol) and Poly(styrene Sulfonic Acid)", Journal of Applied Polymer Science, vol. 27, 1982, pp. 2783-2789.
Supplementary European Search Report dated Dec. 9, 2011 issued in corresponding European Application No. 08 70 3138.1.

*Primary Examiner* — Helen O Conley
(74) *Attorney, Agent, or Firm* — Oblon, Spivak, McClelland, Maier & Neustadt, L.L.P.

(57) ABSTRACT

A polymer electrolyte membrane comprising as a main ingredient a block copolymer (P) which comprises, as its constituents, a vinyl alcoholic polymer block (A) and a polymer block (B) having ion-conducting groups, which block copolymer (P) is cross-linking treated, and a membrane-electrode assembly and a fuel cell using the polymer electrolyte membrane, respectively. Preferred as polymer block (B) is one having a styrene or vinylnaphthalene skeleton or a 2-(meth)acrylamido-2-methylpropane skeleton. The ion-conducting group includes a sulfonic acid group, a phosphonic acid group or the like.

6 Claims, No Drawings

POLYMER ELECTROLYTE MEMBRANE AND PROCESS FOR PREPARATION THEREOF, AND MEMBRANE-ELECTRODE ASSEMBLY AND POLYMER ELECTROLYTE FUEL CELL

TECHNICAL FIELD

This invention relates to a polymer electrolyte membrane and a process for preparation thereof, and a membrane-electrode assembly and a polymer electrolyte fuel cell using the polymer electrolyte membrane, respectively.

BACKGROUND ART

In recent years, as a radical solution of energetic and/or environmental problems, and, further, as a central energy conversion system in the future age of hydrogen energy, fuel cell technique has drawn attention. Especially, polymer electrolyte fuel cells (PEFC or PEMFC) are tried to be applied as power sources for electric automobiles, power sources for portable instruments, and, further, applied to domestically stationary power source apparatuses utilizing electricity and heat at the same time, from the viewpoint of miniaturization and lightening of cells, etc.

A polymer electrolyte fuel cell is generally composed as follows. First, on both sides of a polymer electrolyte membrane having proton conductivity, catalyst layers comprising a platinum group metal catalyst supported on carbon powder and an ion-conducting binder comprising a polymer electrolyte are formed, respectively. On the outsides of the catalyst layers, gas diffusion layers as porous materials through which fuel gas and oxidant gas can pass are formed, respectively. As the gas diffusion layers, carbon paper, carbon cloth, etc. are used. An integrated combination of the catalyst layer and the gas diffusion layer is called a gas diffusion electrode, and a structure wherein a pair of gas diffusion electrodes are bonded to the electrolyte membrane so that the catalyst layers can face to the electrolyte membrane, respectively, is called a membrane-electrode assembly (MEA). On both sides of the membrane-electrode assembly, separators having electric conductivity and gastightness are placed. Gas paths supplying the fuel gas or oxidant gas (e.g., air) onto the electrode surfaces are formed, respectively, at the contact parts of the membrane-electrode assembly and the separators or inside the separators. Power generation is started by supplying a fuel gas such as hydrogen or methanol to one electrode (fuel electrode) and supplying an oxidant gas containing oxygen such as air to the other electrode (oxygen electrode). Namely, the fuel gas is ionized at the fuel electrode to form protons and electrons, the protons pass through the electrolyte membrane and transferred to the oxygen electrode, the electrons are transferred via an external circuit formed by connecting both electrodes into the oxygen electrode, and they react with the oxidant gas to form water. Thus, the chemical energy of the fuel gas is directly converted into electric energy which can be taken out.

As polymer electrolyte membranes for polymer electrolyte fuel cells, Nafion (registered trade mark of Dupont Co., as is the same hereinafter), which is a perfluorocarbonsulfonic acid polymer, is generally used by reason of being chemically stable. However, Nafion is very expensive because of a fluoropolymer. Moreover, Nafion has a problem that, when methanol is used as a fuel, a phenomenon that methanol permeates the electrolyte membrane from one electrode side to the other electrode side (methanol crossover) is liable to occur. Furthermore, fluorine-containing polymers contain fluorine, and consideration to the environment at the time of its synthesis and disposal becomes necessary. From these backgrounds, development of novel polymer electrolyte membranes is desired.

An example of study of ion-conducting polymers using a polyvinyl alcohol as a base, as ion-conducting polymers using a non-fluoropolymer as a base is known. Polyvinyl alcoholic polymers are inexpensive resins and easy to mold into film, and, therefore, considered to be useful as ion-conducting polymer membranes of low costs. Furthermore, since polyvinyl alcoholic polymers do not substantially contain halogens, they have an advantage of a small load on environment at the time of scrapping. For example, there is a report of an example using a polyvinyl alcoholic polymer having sulfonic acid groups obtained by copolymerizing a monomer having a sulfonic acid group as an ion-conducting group with vinyl acetate and then saponifying the resulting copolymer (Non-patent Document 1). However, since vinyl acetate as a starting material of polyvinyl alcoholic polymers is generally poor in copolymerization reactivity with other copolymerizable monomers, introduction of a large amount of ion-conducting groups into the polymer is difficult, and. as a result, display of ion conductivity, which is important as an ion-conducting polymer, is difficult. For solution of this problem, there is an example wherein a blend of sulfonic acid groups-containing polystyrene and a polyvinyl alcohol (Patent Document 1) or a substance obtained by cross-linking of the blend (Patent Document 2) is studied, but, in the first place, polyvinyl alcoholic polymers are poor in compatibility with polystyrene-type polymers, and they furiously phase separate from each other, and, therefore, it is presumed that there is a problem in homogeneity of the membrane. Separately, there is a report on a method of generating ion conductivity by mixing an inorganic acid with a polyvinyl alcoholic polymer (Patent Document 3), but, when water is used or when an aqueous methanol solution is used as a fuel (direct methanol fuel cell), inorganic salts contained in the electrolyte membrane are eluted into the aqueous methanol solution. As a result, the inorganic salts move into the catalyst layer side, and the concentration of the inorganic salts in the electrolyte is lowered and the ion conductivity of the membrane is lowered.

Thus, it is the actual situation that no polyvinyl alcoholic polymer electrolyte membrane which is economical and has improved performance has been proposed.

Patent Document 1: JP 5-174856 A
Patent Document 2: JP 6-76838 A
Patent Document 3: JP 2004-146208 A
Non-patent Document 1: Kobunshi Gakkai Yokoshu (Polymer Society Abstracts) 54 (1), page 1755 (2005)

DISCLOSURE OF INVENTION

Problems to be Solved by the Invention

The object of this invention lies in providing an environment-friendly polymer electrolyte membrane which is economical, has ion channels excellent in ion conductivity and does not substantially contain halogens and a process for preparation thereof, and a membrane-electrode assembly and a polymer electrolyte fuel cell using the polymer electrolyte membrane, respectively.

Means for Solving the Problems

The present inventors have found that the problems can be solved by using a polymer electrolyte membrane comprising as a main ingredient a block copolymer which comprises, as its constituents, a vinyl alcoholic polymer block and a polymer block having ion-conducting groups, and completed the invention.

Thus, the invention relates to a polymer electrolyte membrane comprising as a main ingredient a block copolymer (P) which comprises, as its constituents, a vinyl alcoholic polymer block (A) and a polymer block (B) having ion-conducting groups, which block copolymer (P) is cross-linking treated. The invention also relates to a polymer electrolyte membrane comprising as a main ingredient a mixture of block copolymer (P) with a specific vinyl alcoholic polymer, which mixture is cross-linking treated. The invention further relates to a process for preparation of such a polymer electrolyte membrane, and a membrane-electrode assembly and a polymer electrolyte fuel cell using the polymer electrolyte membrane, respectively.

Effects of Invention

The polymer electrolyte membrane of the invention is an environment-friendly polymer electrolyte membrane which is economical, has ion channels excellent in ion conductivity and does not substantially contain halogens. The polymer electrolyte membrane of the invention has such excellent performance particularly that it exhibits high ion conductivity, but, nevertheless, its swelling in water is inhibited, and it has fuel barrier properties (low permeability and low fuel leak).

BEST MODE FOR CARRYING OUT THE INVENTION

The invention is described in detail below. The polymer electrolyte membrane of the invention comprises as a main ingredient a block copolymer (P) which comprises, as its constituents, a vinyl alcoholic polymer block (A) and a polymer block (B) having ion-conducting groups, which block copolymer (P) is cross-linking treated.

As preferred structures of block copolymer (P), there can be mentioned block copolymers represented by the following general formula (I) or (II).

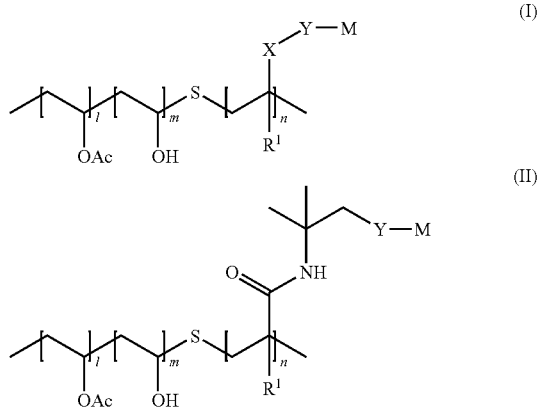

In the above general formulae (I) and (II), polymer block (A) comprises monomer repeating units l and m, the relation between l and m is $m/(l+m) \geqq 0.80$, polymer block (B) comprises monomer repeating units n, and the relation among l, m and n is $0.01 \leqq n/(l+m+n) \leqq 0.50$, $R^1$ represents a hydrogen atom or a methyl group, X represents a phenylene group or naphthylene group respectively optionally substituted with a methyl group, Y represents a sulfonyloxy group (—$SO_3$—), a phosphonyloxy group (—$PO_3H$—) or a carbonyloxy group (—$CO_2$—) and M represents a hydrogen atom, an ammonium ion or an alkali metal ion. In the general formulae (I) and (II), it is not meant that monomer repeating units l and m are arranged as indicated, but it is merely meant that both units are present, and, usually, both are arranged mutually randomly.

Preferred as Y are a sulfonyloxy group and a phosphonyloxy group which give higher ion conductivity. As the alkali metal ion in the definition of M, there can be mentioned a sodium ion, a potassium ion, a lithium ion, etc.

The $m/(l+m)$ ratio (the value obtained by multiplying this value by 100 indicates a saponification degree) is necessary to be 0.80 or more, preferably 0.88 or more, and more preferably 0.95 or more (namely, there can be a case wherein l is 0). When the $m/(l+m)$ ratio is less than 0.80, the degree of crystallization of the vinyl alcoholic polymer block (A) part in block copolymer (P) is inadequate, and when a polymer electrolyte membrane comprising such a block copolymer is used as a polymer electrolyte membrane of a polymer electrolyte fuel cell directly using a fuel such as methanol, there is a possibility that fuel crossover increases.

As to the proportion n of the monomer unit having an ion-conducting group, being $0.01 \leqq n/(l+m+n) \leqq 0.50$ is necessary, being $0.02 \leqq n/(l+m+n) \leqq 0.40$ is preferred, and being $0.05 \leqq n/(l+m+n) \leqq 0.30$ is further preferred. As to the proportion n of the monomer unit having an ion-conducting group, in the case of $0.01 > n/(l+m+n)$, there is a possibility that a polymer electrolyte membrane having ion conductivity is not obtained, and in the case of $n/(l+m+n) > 0.50$, there is a possibility that polymer block (B) having ion conductivity forms a matrix (sea component) in block copolymer (P), and as a result, the fuel barrier properties and water resistance of the polymer electrolyte membrane are lowered.

The block copolymer constituting the polymer electrolyte membrane of the invention needs to have ion-conducting groups in polymer block (B). When ion conductivity is referred to in the invention, as the ion, there can be mentioned a proton, etc. As the ion-conducting group, there is no particular restriction so long as it is such a group that membrane-electrode assemblies prepared using the polymer electrolyte membrane can exhibit sufficient ion conductivity, but, a sulfonic acid group or a phosphonic acid group or salts of them are preferred. As the ion-conducting group, there can also be used a carboxyl group or a salt thereof.

The characteristic of the polymer electrolyte membrane of the invention lies in that it comprises as a main ingredient a block copolymer (P) which comprises, as its constituents, a vinyl alcoholic polymer block (A) and a polymer block (B) having ion-conducting groups. The most important property of an electrolyte membrane is ion conductivity in the membrane (easiness of motion of the ion), and, for example, when the electrolyte membrane is used in polymer electrolyte fuel cells, it is a well-known fact that output at the time of power generation is greatly influenced by its ion conductivity. Herein, it is important how to form paths in the membrane through which ions move (ion channels). Usual vinyl alcoholic polymer electrolyte membranes are roughly classified into (1) a mixture of a polymer substantially not having ion-conducting groups with a polymer having ion-conducting groups and (2) a vinyl alcoholic polymer having ion-conducting groups. However, as to (1), there are problems that they are greatly different in compatibility and, thus, so-called macro phase separate from each other, and the ion conductivity of the whole membrane is strikingly lowered or although ions are conducted, the strength of the membrane becomes insufficient or it becomes difficult for the membrane to hold its shape, and so on. Further, as to (2), in order to display ion conductivity, it is needed to introduce a large amount of ion-conducting groups, and as a result, there arise problems such as shortage of membrane strength, difficulty of holding of membrane shapes, swelling in water or fuels such as methanol and unstableness of dimensions. On the other hand, the block copolymer of the present invention comprises vinyl alcoholic polymer block (A) and polymer block (B) having ion-conducting groups, and they play mutually different roles, namely block (A) bears a role of maintenance of membrane strength and the shape as a whole and block (B) bears a role of exhibition of ion conductivity, and, thereby, compatibility of ion conductivity with membrane strength and/or dimensional stability is successfully attained. Furthermore, in difference from the case of a simple mixture, there is an advantage that since it is possible to control micro phase separation structure between block (A) and block (B) easily, it is possible to easily control the diameter and structure of the continuous layers of block (B) which functions as ion channels.

Processes for preparation of block copolymer (P) used in the invention are, mainly, roughly classified into the following two processes. Namely, (1) a process of preparing a desired block copolymer and then, bonding ion-conducting groups, and (2) a process of preparing a desired block copolymer using at least one monomer having an ion-conducting group. Therein, as to (1), a process of copolymerizing, in the presence of a vinyl alcoholic polymer having SH group at the end (block (A)), one or plural monomers with block (A) and, then, introducing ion-conducting groups into block (B) in the resulting block copolymer, and, as to (2), a process of radical polymerizing, in the presence of a vinyl alcoholic polymer having SH group at the end (block (A)), at least one monomer having an ion-conducting group with block (A) to prepare a block copolymer are preferred in view of industrial easiness. Particularly, from the viewpoint that it is possible to easily control the kind and amount of each component in vinyl alcoholic polymer block (A) and polymer block (B) having ion-conducting groups, preferred is a process of radical polymerizing, in the presence of a vinyl alcoholic polymer having SH group at the end (block (A)), at least one monomer having an ion-conducting group to prepare a block copolymer.

First, a process of preparing a desired block copolymer using at least one monomer having an ion-conducting group is described below.

A vinyl alcoholic polymer having SH group at the end can be obtained according to a process described, for example, in JP 59-187003 A or the like. Namely, there can be mentioned a process of saponifying a vinyl ester polymer obtained by radical polymerizing, in the presence of a thiolic acid, a vinyl ester monomer, for example a vinyl ester mainly comprising vinyl acetate.

The polymerization degree of the vinyl alcoholic polymer having SH group at the end is preferably 100 or more and 3,500 or less, more preferably 200 or more and 3,000 or less, still more preferably 250 or more and 2,500 or less. When the polymerization degree is less than 100, there is a possibility that the membrane strength of a polymer electrolyte membrane comprising as a main ingredient block copolymer (P) finally obtained is insufficient, and, when the polymerization degree is more than 3,500, there is a possibility that the amount of the SH group introduced into the vinyl alcoholic polymer is insufficient, and it is impossible to obtain block copolymer (P) efficiently.

As a process of obtaining a block copolymer (P) using a vinyl alcoholic polymer having SH group at the end and monomer(s) having an ion-conducting group, there can be mentioned a process described, for example, in JP 59-189113 A or the like.

Namely, as described, for example, in JP 59-189113 A, it is possible to obtain a block copolymer (P) by radical polymerizing, in the presence of a vinyl alcoholic polymer having SH group at the end, monomer(s) having an ion-conducting group. This radical polymerization can be made according to a known method such as bulk polymerization, solution polymerization, pearl polymerization or emulsion polymerization, but it is preferred to conduct the radical polymerization in a solvent capable of dissolving the vinyl alcoholic polymer having SH group at the end, for example, in a medium comprising water or dimethyl sulfoxide as a main ingredient. As a polymerization process, any of a batch method, a semi-batch method and a continuous method can be adopted.

The above radical polymerization can be made using a radical polymerization initiator suitable to the polymerization system selected from usual radical polymerization initiators such as, for example, 2,2'-azobisisobutyronitrile, benzoyl peroxide, lauroyl peroxide, diisopropyl peroxycarbonate, potassium persulfate and ammonium persulfate, but, in the case of polymerization in an aqueous system, redox polymerization initiation by the SH group at the end of the vinyl alcoholic polymer and an oxidizing agent such as potassium bromate, potassium persulfate, ammonium persulfate or hydrogen peroxide is also possible, and, among them, potassium bromate is a particularly preferred initiator in synthesis of block copolymer (P) used in the invention because potassium bromate does not generate a radical by itself under a usual condition, and is decomposed only by redox reaction with the SH group at the end of the vinyl alcoholic polymer to generate a radical.

In radical polymerization of monomer(s) having an ion-conducting group in the presence of a vinyl alcoholic polymer having SH group at the end, it is preferred that the polymerization system is acidic. This is because, in a basic environment, a velocity at which the SH group ionically adds to the double bond of the monomer to disappear is large and thereby polymerization efficiency is strikingly lowered, and in the case of polymerization in an aqueous system, it is preferred to make all polymerization operations at a pH of 4 or less.

In synthesis of block copolymer (P) according to the above-mentioned method, as the monomer having an ion-conducting group used for synthesis of block copolymer (P) represented by the above-mentioned general formula (I), there can be mentioned p-styrenesulfonic acid or an alkali metal salt or ammonium salt thereof, p-styrenephosphonic acid or an alkali metal salt or ammonium salt thereof, p-styrenecarboxylic acid or an alkali metal salt or ammonium salt thereof, α-methyl-p-styrenesulfonic acid or an alkali metal salt or ammonium salt thereof, α-methyl-p-styrenephosphonic acid or an alkali metal salt or ammonium salt thereof, α-methyl-p-styrenecarboxylic acid or an alkali metal salt or ammonium salt thereof, 2-vinylnaphthalenesulfonic acid or an alkali metal salt or ammonium salt thereof, 2-vinylnaphthalenephosphonic acid or an alkali metal salt or ammonium salt thereof, 2-vinylnaphthalenecarboxylic acid or an alkali metal salt or ammonium salt thereof, etc.

In synthesis of block copolymer (P) according to the above-mentioned method, as the monomer having an ion-conducting group used for synthesis of block copolymer (P) represented by the above-mentioned general formula (II), there can be mentioned 2-(meth)acrylamido-2-methylpropanesulfonic acid or an alkali metal salt or ammonium salt thereof, 2-(meth)acrylamido-2-methylpropanephosphonic acid or an alkali metal salt or ammonium salt thereof, 2-(meth)acrylamido-2-methylpropanecarboxylic acid or an alkali metal salt or ammonium salt thereof, etc.

In synthesis of the above-mentioned block copolymer (P), it is desirable, in order to give high ion conductivity to the polymer electrolyte membrane of the invention, that polymer block (B) having ion-conducting groups is composed only of a monomer unit having an ion-conducting group, for example a unit tied by n in the general formula (I) or (II), but polymer block (B) may contain a monomer unit having no ion-conducting group. As monomers giving such monomer units having no ion-conducting group, there can be mentioned α-olefins such as ethylene, propylene, 1-butene, isobutene and 1-hexene; acrylic acid or salts thereof; acrylic esters such as methyl acrylate, ethyl acrylate, n-propyl acrylate and isopropyl acrylate; methacrylic acid or salts thereof; methacrylic esters such as methyl methacrylate, ethyl methacrylate, n-propyl methacrylate and isopropyl methacrylate; other unsaturated carboxylic acids or derivatives thereof such as fumaric acid, maleic acid, itaconic acid, maleic anhydride and itaconic anhydride; acrylamide; acrylamide derivatives such as N-methylacrylamide and N-ethylacrylamide; methacrylamide; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxyl group-containing vinyl ethers such as ethylene glycol vinyl ether, 1,3-propanediol vinyl ether and 1,4-butanediol vinyl ether; allyl acetate; allyl ethers such as propyl allyl ether, butyl allyl ether and hexyl allyl ether; monomers having an oxyalkylene group; isopropenyl acetate; hydroxyl group-containing α-olefins such as 3-buten-1-ol, 4-penten-1-ol, 5-hexen-1-ol, 7-octen-1-ol, 9-decen-1-ol and 3-methyl-3-buten-1-ol; sulfonic acid group-containing monomers such as ethylenesulfonic acid, allylsulfonic acid, methallylsulfonic acid and 2-acrylamido-2-methylpropanesulfonic acid; cationic group-containing monomers such as vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine and allylethylamine; monomers having a silyl group such as vinyltrimethoxysilane, vinyltriethoxysilane and vinyltriacetoxysilane; etc. It is preferred that the proportion of monomer units having an ion-conducting group in polymer block (B) is 80% by mol or more, particularly 90% by mol or more.

There is no particular restriction on the reaction temperature of the above-mentioned radical polymerization, but, it is usually suitable that the temperature is 0 to 200° C. The progress of polymerization can be traced by determination of remaining monomer(s) using a chromatography, NMR spectrum or the like, and at a point of time when a desired n/(l+m+n) ratio has been reached, the polymerization is terminated by a known method, for example, by cooling of the polymerization system.

In order to make the polymer electrolyte membrane of the invention show sufficient ion conductivity to use it as one for polymer electrolyte fuel cells, the ion exchange capacity of the resulting block copolymer (P) is preferably 0.30 meq/g or more and more preferably 0.50 meq/g or more. As to the upper limit of the ion exchange capacity of the block copolymer, since if the ion exchange capacity is too large, there is a tendency that hydrophilicity increases to make water resistance insufficient, the upper limit is preferably 3.0 meq/g or less.

As a process for preparation of block copolymer (P), a process comprises preparing, first, a block copolymer having substantially no ion-conducting group, and, then, introducing ion-conducting groups into block (B) is also preferred. The block copolymer having substantially no ion-conducting group can be prepared in the same manner as in the above-mentioned process of preparing block copolymer (P) using a monomer having an ion-conducting group giving a unit tied by n in the general formula (I), except for using a monomer wherein the ion-conducting group of a monomer having an ion-conducting group is replaced with a hydrogen atom, in place of a monomer having an ion-conducting group.

As processes for introducing ion-conducting groups into the resulting block copolymer, it is preferred to use the following processes.

First, a process for introducing sulfonic acid groups into the resulting block copolymer is described. The sulfonation can be made by a known sulfonation method. As such method, there can be exemplified a method comprising preparing a solution or suspension of the block copolymer in an organic solvent and adding a sulfonating agent, followed by mixing, a process of directly adding a gaseous sulfonating agent to the block copolymer, and the like.

As the sulfonating agent to be used, there can be exemplified sulfuric acid, a mixture system of sulfuric acid and an aliphatic acid anhydride, chlorosulfonic acid, a mixture system of chlorosulfonic acid and trimethylsilyl chloride, sulfur trioxide, a mixture system of sulfur trioxide and triethyl phosphate, an aromatic organic sulfonic acid represented by 2,4,6-trimethylbenzenesulfonic acid, and so on. Further, as the organic solvent to be used, there can be exemplified a halogenated hydrocarbon such as methylene chloride, a straight-chain aliphatic hydrocarbon such as hexane, a cyclic aliphatic hydrocarbon such as cyclohexane, and so on, and they can be used also with an appropriate selection from plural combinations thereof, if necessary.

Next, a process for introducing a phosphonic acid group into the resulting block copolymer is described. Phosphonation can be conducted by a known phosphonation method. Specifically, there can, for example, be mentioned a process of preparing a solution or suspension of the block copolymer in an organic solvent, reacting the copolymer with chloromethyl ether or the like in the presence of anhydrous aluminum chloride to introduce halomethyl groups into the aromatic rings, reacting the resulting copolymer with phosphorus trichloride and anhydrous aluminum chloride added, and then conducting hydrolysis reaction to introduce phosphonic acid groups; and so on. There can further be exemplified a process of adding phosphorus trichloride and anhydrous aluminum chloride to the copolymer and reacting them to introduce phosphinic acid groups into the aromatic rings, and then oxidizing the phosphinic acid groups into phosphonic acid groups with nitric acid; and so on.

As to the degree of sulfonation or phosphonation, it is suitable to conduct sulfonation or phosphonation until the ion exchange capacity of the resulting block copolymer (P) becomes preferably 0.30 meq/g or more and more preferably 0.50 meq/g or more. As to the upper limit of sulfonation or phosphonation, since the ion exchange capacity of the resulting block copolymer (P) is too large, there is a tendency that hydrophilicity increases to make water resistance insufficient, the upper limit is preferably 3.0 meq/g or less. Thereby, more practical ion conduction performance is obtained. The ion exchange capacity of the sulfonated or phosphonated block copolymer, or sulfonation proportion or phosphonation proportion of the block copolymer can be calculated using analytical method(s) such as an acid value titration method, infrared spectroscopy, measurement of nuclear magnetic resonance spectrum ($^1$H-NMR spectrum) and/or the like.

The ion-conducting group can be introduced in the form of a salt neutralized with a proper metal ion (e.g., an alkali metal ion) or a counter ion (e.g., an ammonium ion). Otherwise, by conducting ion exchange using an appropriate method, a block copolymer wherein the sulfonic acid group or phosphonic acid group is converted to a salt form can be obtained.

The polymer electrolyte membrane of the invention can also be a polymer electrolyte membrane comprising as a main ingredient a mixture of block copolymer (P) obtainable as mentioned above with a vinyl alcoholic polymer (Q) having a polymerization degree of 200 to 8,000, particularly 500 to 7,000 and a saponification degree of 80% by mol or more, particularly 85% by mol or more in which mixture, the proportion of both as a mass ratio is (P)/(Q)$\geqq$3/97, and which mixture is cross-linking treated. The proportion of both in the mixture is preferably (P)/(Q)$\geqq$5/95, and more preferably (P)/(Q)$\geqq$10/90. When the proportion of both is (P)/(Q)<3/97, there is a possibility that the ion conductivity of the resulting polymer electrolyte membrane is insufficient, and performance as a polymer electrolyte fuel cell is not sufficiently displayed. Vinyl alcoholic polymer (Q) can be obtained by radical polymerizing a vinyl ester monomer, for example vinyl acetate according to a conventional method and saponifying the resulting polymer.

Vinyl alcoholic polymer (Q) can also be a copolymer of a vinyl ester monomer with such a monomer as mentioned below in which copolymer the polymerization degree of the part composed of the vinyl ester monomer is 200 to 8,000, particularly 500 to 7,000 and the saponification degree of the part is 80% by mol or more, particularly 85% by mol or more. As the latter monomer, there can be mentioned α-olefins such as ethylene, propylene, 1-butene, isobutene and 1-hexene; unsaturated carboxylic acids or derivatives thereof such as fumaric acid, maleic acid, itaconic acid, maleic anhydride and itaconic anhydride; acrylic acid or salts thereof; acrylic esters such as methyl acrylate, ethyl acrylate, n-propyl acrylate and isopropyl acrylate; methacrylic acid or salts thereof; methacrylic esters such as methyl methacrylate, ethyl methacrylate, n-propyl methacrylate and isopropyl methacrylate; acrylamide; acrylamide derivatives such as N-methylacrylamide and N-ethylacrylamide; methacrylamide; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxyl group-containing vinyl ethers such as ethylene glycol vinyl ether, 1,3-propanediol vinyl ether and 1,4-butanediol vinyl ether; allyl acetate; allyl ethers such as propyl allyl ether, butyl allyl ether and hexyl allyl ether; monomers having an oxyalkylene group; isopropenyl acetate; hydroxyl group-containing α-olefins such as 3-buten-1-ol, 4-penten-1-ol, 5-hexen-1-ol, 7-octen-1-ol, 9-decen-1-ol and 3-methyl-3-buten-1-ol; a sulfonic acid group-containing monomers such as ethylenesulfonic acid, allylsulfonic acid, methallylsulfonic acid and 2-acrylamido-2-methylpropanesulfonic acid; cationic group-containing monomers such as vinyloxyethyltrimethylammonium chloride, vinyloxybutyltrimethylammonium chloride, vinyloxyethyldimethylamine, vinyloxymethyldiethylamine, N-acrylamidomethyltrimethylammonium chloride, N-acrylamidoethyltrimethylammonium chloride, N-acrylamidodimethylamine, allyltrimethylammonium chloride, methallyltrimethylammonium chloride, dimethylallylamine and allylethylamine; monomers having a silyl group such as vinyltrimethoxysilane, vinyltriethoxysilane and vinyltriacetoxysilane; etc. It is preferred that the proportion of vinyl ester monomer units in the block copolymer is 80% by mol or more, particularly 90% by mol or more.

Vinyl alcoholic polymer (Q) can also be an end-modified vinyl alcoholic polymer obtained by radical polymerizing a vinyl ester monomer in the presence of a thiol compound such as 2-mercaptoethanol, n-dodecylmercaptan, mercaptoacetic acid or 3-mercaptopropionic acid and saponifying the resulting vinyl ester polymer, which end-modified vinyl alcoholic polymer has a polymerization degree of 200 to 8,000, particularly 500 to 7,000 and a saponification degree of 80% by mol or more, particularly 85% by mol or more.

The polymer electrolyte membrane of the invention comprises as a main ingredient block copolymer (P) or a mixture of block copolymer (P) with vinyl alcoholic polymer (Q), but it can contain, in such an amount that its characteristics including ion conductivity are not spoiled, an inorganic filler. As specific examples of the inorganic filler, there can be mentioned talc, calcium carbonate, silica, glass fiber, mica, kaolin, titanium oxide, etc. The content of block copolymer (P) or the mixture of this and vinyl alcoholic polymer (Q) in the polymer electrolyte membrane of the invention is preferably 70% by mass or more, more preferably 90% by mass or more and still more preferably 95% by mass or more.

In order to make the polymer electrolyte membrane of the invention show sufficient ion conductivity, its ion exchange capacity is preferably 0.30 meq/g or more and more preferably 0.50 meq/g or more. The upper limit of the polymer electrolyte membrane of the invention is preferably 3.0 meq/g or less since the ion exchange capacity is too large, a tendency occurs that its hydrophilicity increases to make water resistance insufficient.

The polymer electrolyte membrane of the invention can be prepared according to the following preparation method.

Namely, a membrane obtained from a solution of block copolymer (P) or a solution of a mixture of block copolymer (P) with vinyl alcoholic polymer (Q) is heat treated at a temperature of 100° C. or more, subjected to a cross-linking treatment with a dialdehyde compound in water or an alcohol or a mixed solvent thereof under an acidic condition, and, then, washed with water.

When an inorganic filler is made to be contained in the polymer electrolyte membrane of the invention, a method for it is not particularly restricted so long as it is a method whereby a desired amount can be incorporated therein, and there can, for example, be mentioned a method comprising dispersing or dissolving an inorganic filler in a solution of block copolymer (P) or a solution of a mixture of block copolymer (P) with vinyl alcoholic polymer (Q), a method comprising using an inorganic filler together with a dialdehyde compound when a cross-linking treatment is made to the polymer electrolyte membrane, etc.

As a solvent used when a membrane is obtained from a solution of block copolymer (P) or a solution of a mixture of block copolymer (P) with vinyl alcoholic polymer (Q), water, a lower alcohol such as methanol, ethanol, 1-propanol or 2-propanol, or a mixed solvent thereof is usually used, and, then, usually by casting the solution to volatilize the solvent, a membrane is obtained. Temperature for obtaining a membrane is not particularly restricted, but, temperature in the range of room temperature to 100° C. or thereabouts is usually suitable.

The resulting membrane is usually heat treated at a temperature of 100° C. or more, preferably 110° C. or more and still more preferably 120° C. or more. As to the upper limit of heat treatment temperature, in view of prevention of thermal decomposition of block copolymer (P), the heat treatment is conducted preferably at 250° C. or less and more preferably at 200° C. or less. Heat treatment time is not particularly restricted, but, is usually 5 seconds or more but 10 hours or less, preferably 10 seconds or more but 5 hours or less and more preferably 30 seconds or more but 2 hours or less. When the heat treatment time is too short, sufficient crystallization does not progress, and when it is too long, not only productive efficiency is lowered but there is a possibility that deterioration reaction such as thermal decomposition of vinyl alcoholic polymer (Q) occurs.

Since, by thermal treatment, crystallization degree of vinyl alcoholic polymer block (A) composing block copolymer (P), and, in the case of a mixed membrane with vinyl alcoholic polymer (Q), vinyl alcoholic polymer (Q) in addition to vinyl alcoholic polymer block (A) increases, fuel crossover in the case wherein the above membrane is used as a polymer electrolyte membrane for polymer electrolyte fuel cells directly using a fuel (particularly methanol) is reduced.

The resulting heat treated membrane is, then, cross-linking treated with a cross-linking agent, usually, in water, a lower alcohol such as methanol, ethanol, 1-propanol or 2-propanol or a mixed solvent thereof, under an acidic condition with an acid such as hydrochloric acid, sulfuric acid or nitric acid, and washed with water. As the cross-linking agent, there can be mentioned dialdehyde compounds such as glyoxal, malonaldehyde, succinaldehyde, glutaraldehyde, hexane-1,6-dial, octanedial, nonanedial, decanedial, dodecanedial, 2,4-dimethylhexanedial, 5-methylheptanedial, 4-methyloctanedial, 2,5-dimethyloctanedial and 3,6-dimethyldecanedial; and acetal compounds obtained by reacting such a dialdehyde compound with an alcohol such as methanol, ethanol, propanol, butanol, ethylene glycol or propylene glycol to acetalize both ends or one end. These can be used alone or in combination. Usually, the concentration of the acid is suitably 0.05 to 1 mol/liter, and the concentration of the cross-linking agent such as a dialdehyde compound is suitably 0.05 to 100 vol %. The temperature of the cross-linking treatment is not particularly restricted so long as it is such a temperature at which cross-linking reaction sufficiently progresses, but is preferably 0 to 150° C. and more preferably 20 to 100° C. At a temperature lower than 0° C., there is a possibility that reaction does not progress, and at a temperature higher than 150° C., there is a possibility that the solvent and/or dialdehyde compound used are/is volatilized to prevent reaction from progressing. The extent of the cross-linking treatment is not particularly restricted, but it is preferred to make the cross-linking treatment so that the length of the undried polymer electrolyte membrane after the cross-linking treatment and the washing treatment may be in the range of 1 to 1.1 times the length of the polymer electrolyte membrane after drying. In the case wherein this value is more than 1.1, when the membrane is used as a polymer electrolyte membrane for polymer electrolyte fuel cells, there is a possibility of occurrence of fuel gas crossover or the like.

As to the polymer electrolyte membrane of the invention, in view of performance, membrane strength, handling properties, etc. necessary as a polymer electrolyte membrane for fuel cells, the thickness of the membrane is preferably on the order of 1 to 1,000 μm. When the membrane thickness is less than 1 μm, the mechanical strength and/or gas barrier properties of the membrane tend to be insufficient, and when the membrane thickness is more than 1,000 μm, there arises a tendency that the electric resistance of the membrane becomes too large and sufficient ion conductivity is not generated, and, as a result, performance of the cells gets worse. The membrane thickness is preferably 5 to 500 μm and more preferably 7 to 300 μm.

The above-mentioned polymer electrolyte membrane of the invention can suitably be used in electrochemical systems such as polymer electrolyte fuel cells, steam pumps, dehumidifiers, air-conditioning equipments, electrochromic devices, electrolyzing apparatuses, electrolysis-type hydrogen-generating apparatuses, electrolytic hydrogen peroxide manufacturing apparatuses, electrolytic water-manufacturing apparatuses, humidity sensors, hydrogen sensors, primary cells, secondary cells and light switching systems. Among them, the membrane can particularly preferably be used as an electrolyte membrane for polymer electrolyte fuel cells such as pure hydrogen ones using hydrogen as the fuel gas, methanol-reforming ones using hydrogen obtained by reforming methanol, natural gas-reforming ones using hydrogen obtained by reforming natural gas, gasoline-reforming ones using hydrogen obtained by reforming gasoline and direct methanol ones wherein methanol is used directly.

A membrane-electrode assembly using the polymer electrolyte membrane of the invention is described below. As to production of the membrane-electrode assembly, there is no particular restriction, and a known process can be applied. For example, there can be mentioned a process of applying a catalyst paste containing an ion-conducting binder onto a gas diffusion layer by a printing method or a spraying method and drying the paste to form an assembly of the catalyst layer and the gas diffusion layer, and then bonding a pair of the assemblies, with each catalyst layer being made to be inside, to both sides of the polymer electrolyte membrane by a hot press or the like; or a process of applying the catalyst paste onto both sides of the polymer electrolyte membrane by a printing method or a spraying method and drying the paste to form a catalyst layer, and then press bonding a gas diffusion layer onto each catalyst layer by a hot press or the like. As still another production process, there is a process of applying a solution or suspension containing an ion-conducting binder onto both sides of the polymer electrolyte membrane and/or onto the surfaces of the catalyst layers in a pair of gas diffusion electrodes, sticking the electrolyte membrane and the surfaces of the catalyst layers together, and then bonding them by thermocompression bonding or the like. In this case, the solution or suspension can be applied onto any one or both of the electrolyte membrane and the surfaces of the catalyst layers. As further still another production process, there is a process of applying the above catalyst paste onto a substrate film such as one made of polytetrafluoroethylene (PTFE) and drying the paste to form a catalyst layer, transferring a pair of the catalyst layers on the film substrates onto both sides of the polymer electrolyte membrane by thermocompression bonding, peeling off the film substrates to obtain an assembly of the electrolyte membrane and the catalyst layers, and then press bonding a gas diffusion layer onto each catalyst layer. In these methods, it is possible to conduct the above process in a state that the ion-conducting group is made to a salt with a metal such as Na, and restore the proton type by acid treatment after the bonding.

As the ion-conducting binder constituting the membrane-electrode assembly, there can, for example, be used an ion-conducting binder comprises an existing perfluorocarbonsulfonic acid-type polymer such as "Nafion" (registered trade mark, made by Dupont Co.) or "Gore-select" (registered trade mark, made by Gore Co.); an ion-conducting binder comprises a sulfonated polyether sulfone or a sulfonated polyether ketone; an ion-conducting binder composed of a polybenzimidazole impregnated with phosphoric acid or sulfuric acid; or the like. It is also possible to make an ion-conducting binder using the block copolymer constituting the polymer electrolyte membrane of the invention. For further promoting the adhesion between the electrolyte membrane and the gas diffusion electrode, it is preferred to use an ion-conducting binder formed from the same material as that of the polymer electrolyte membrane.

As to the constitutive materials of the catalyst layer in the membrane-electrode assembly, there is no particular restriction as the electrically conductive material/catalyst support, and, for example, carbon materials are mentioned. As the carbon materials, there can be mentioned carbon blacks such as furnace black, channel black and acetylene black; activated carbon; graphite, etc., and these can be used alone or as a mixture of two or more. As the catalyst metal, any metal can be used so long as it is a metal which promotes oxidation reaction of the fuel such as hydrogen or methanol and reduction reaction of oxygen, and there can, for example, be mentioned platinum, gold, silver, palladium, iridium, rhodium, ruthenium, iron, cobalt, nickel, chromium, tungsten, manganese, etc., and their alloys such as a platinum-ruthenium alloy. Among them, platinum or a platinum alloy is used in many cases. The particle size of a metal as the catalyst is, usually, 10 to 300 angstroms. It is advantageous in view of costs to support such a catalyst on an electrically conductive material/catalyst support such as carbon because of less use amount of the catalyst. If necessary, it is possible to make the catalyst layer contain a water repellent. As the water repellent, there can, for example, be mentioned various thermoplastic resins such as polytetrafluoroethylene, polyvinylidene fluoride, a styrene-butadiene copolymer and a poly(ether ether ketone).

The gas diffusion layer of the membrane-electrode assembly is constituted by a material having electrical conductivity and gas permeability, and as the material, there can, for example, be mentioned a porous material comprising carbon fiber such as carbon paper or carbon cloth. Such a material can be subjected to water repellent treatment for promoting water repellency.

By inserting a membrane-electrode assembly obtained by a process as mentioned above between electrically conductive separator materials having both roles of separation of the electrode chambers and as paths for supplying gas to the electrode, a polymer electrolyte fuel cell can be obtained. The membrane-electrode assembly of the invention can be used as a membrane-electrode assembly for polymer electrolyte fuel cells such as a pure hydrogen one using hydrogen as the fuel gas, a methanol-reforming one using hydrogen obtained by reforming methanol, a natural gas-reforming one using hydrogen obtained by reforming natural gas, a gasoline-reforming one using hydrogen obtained by reforming gasoline and a direct methanol one wherein methanol is used directly.

It is added that using the fuel cell of the invention alone or as a stack formed by laminating plural ones, and a fuel cell system into which the fuel cell or the stack is integrated are also within the range of the invention.

EXAMPLES

The present invention is further specifically described below by showing synthetic examples of the block copolymers and comparative copolymers, preparation examples of polymer electrolyte membranes, and performance tests of the polymer electrolyte membranes and results thereof, but the invention is not restricted thereby.

(1) Synthesis of Block Copolymers and Comparative Copolymers

Synthetic Example A of a Block Copolymer

In a 2-L four-necked separable flask equipped with a reflux condenser and a stirring blade were put 700 g of water and 100 g of Poval M-115 made by KURARAY CO., LTD. (PVA having SH group at the end, polymerization degree 1,500, saponification degree 98.5% by mol) as a vinyl alcoholic polymer having SH group at the end, the mixture was heated up to 95° C. under stirring to dissolve the vinyl alcoholic polymer, and then the resulting solution was cooled to room temperature. ½-normal sulfuric acid was added to the aqueous solution to adjust the pH to 3.0. Separately, 50 g of sodium p-styrenesulfonate was dissolved in 200 g of water, this solution was added to the previously prepared aqueous solution under stirring, the mixture was warmed to 70° C., and the inside atmosphere of the flask was replaced with nitrogen by bubbling nitrogen into the aqueous solution for 30 minutes. After the nitrogen replacement, 50 mL of a 4% aqueous solution of potassium persulfate was successively added to the above aqueous solution over a period of 1.5 hours to initiate and proceed with block polymerization, inside temperature was held at 75° C. for 1 hour to further proceed with the polymerization, and then the reaction solution was cooled to obtain an aqueous PVA-(b)-sodium p-styrenesulfonate block copolymer solution having a solid concentration of 13.7%. Part of the thus obtained aqueous solution was dried and dissolved in heavy water, the solution was subjected to $^1$H-NMR measurement at 400 MHz, and as a result, the mol ratio of the vinyl acetate unit (l), the vinyl alcohol unit (m) and the sodium p-styrenesulfonate unit (n) was l:m:n=1.35:88.87:9.78 (% by mol).

Synthetic Example B of a Block Copolymer

The same operations as in Synthetic example A of a block copolymer were conducted except that 75 g of sodium p-styrenesulfonate was used. Part of the thus obtained aqueous solution was dried and dissolved in heavy water, the solution was subjected to $^1$H-NMR measurement at 400 MHz, and as a result, the mol ratio of the vinyl acetate unit (l), the vinyl alcohol unit (m) and the sodium p-styrenesulfonate unit (n) was l:m:n=1.29:84.73:13.98 (% by mol).

Synthetic Example C of a Block Copolymer

The same operations as in Synthetic example A of a block copolymer were conducted except that 10 g of sodium p-styrenesulfonate was used. Part of the thus obtained aqueous solution was dried and dissolved in heavy water, the solution was subjected to $^1$H-NMR measurement at 400 MHz, and as a result, the mol ratio of the vinyl acetate unit (l), the vinyl alcohol unit (m) and the sodium p-styrenesulfonate unit (n) was l:m:n=1.47:96.41:2.12 (% by mol).

Synthetic Example D of a Block Copolymer

The same operations as in Synthetic example A of a block copolymer were conducted except that 200 g of sodium p-styrenesulfonate was used. Part of the thus obtained aqueous solution was dried and dissolved in heavy water, the solution was subjected to $^1$H-NMR measurement at 400 MHz, and as a result, the mol ratio of the vinyl acetate unit (l), the vinyl alcohol unit (m) and the sodium p-styrenesulfonate unit (n) was l:m:n=1.15:75.58:23.27 (% by mol).

Synthetic Example E of a Block Copolymer

The same operations as in Synthetic example A of a block copolymer were conducted except that 50 g of sodium 2-acrylamido-2-methylpropanesulfonate was used in place of 50 g of sodium p-styrenesulfonate. Part of the thus obtained aqueous solution was dried and dissolved in heavy water, the solution was subjected to $^1$H-NMR measurement at 400 MHz, and as a result, the mol ratio of the vinyl acetate unit (l), the vinyl alcohol unit (m) and the sodium 2-acrylamido-2-methylpropanesulfonate unit (n) was l:m:n=1.37:89.76:8.87 (% by mol).

Synthetic Example F of a Block Copolymer

The same operations as in Synthetic example E of a block copolymer were conducted except that 75 g of sodium 2-acrylamido-2-methylpropanesulfonate was used. Part of the thus obtained aqueous solution was dried and dissolved in solution, the solution was subjected to $^1$H-NMR measurement at 400 MHz, and as a result, the mol ratio of the vinyl acetate unit (l), the vinyl alcohol unit (m) and the sodium 2-acrylamido-2-methylpropanesulfonate unit (n) was l:m:n=1.31:85.95:12.74 (% by mol).

Synthetic Example a of a Saponified Product of a Copolymer Between Vinyl Acetate and Sodium 2-acrylamido-2-methylpropanesulfonate In a 6-L separable flask equipped with a stirrer, a temperature sensor, a dropping funnel and a reflux condenser were put 1920 g of vinyl acetate, 1260 g of methanol and 43.3 g of a solution of sodium 2-acrylamido-2-methylpropanesulfonate in methanol (the concentration of sodium 2-acrylamido-2-methylpropanesulfonate=25% by mass), the inside atmosphere of the flask was replaced with nitrogen under stirring and the internal temperature was raised to 60° C. To this system was added 20 g of methanol containing 1.3 g of 2,2'-azobisisobutyronitrile whereby polymerization reaction was initiated. The polymerization reaction was conducted for 4 hours while 484.7 g of a 25% by mass methanol solution of sodium 2-acrylamido-2-methylpropanesulfonate was added from the time of polymerization initiation, and, at that point of time, the polymerization reaction was terminated. The solid concentration in the system at the time of the termination of polymerization reaction was 34.7% by mass. Then, the unreacted vinyl acetate monomer was repelled by introducing methanol vapor into the system to obtain a methanol solution containing a vinyl ester copolymer in a concentration of 40% by mass.

Methanol and a 10% by mass methanol solution of sodium hydroxide were added in this order to the 40% by mass methanol solution of the vinyl ester copolymer under stirring so that the mol ratio of sodium hydroxide to the vinyl acetate unit of the copolymer could be 0.025 and the solid concentration of the vinyl ester copolymer could be 30% by mass, and saponification reaction was initiated at 40° C.

Immediately after a gelled product was formed in proportion to progress of saponification reaction, the gelled product was taken out from the system and pulverized, and at a lapse of one hour after the gelled product was formed, methyl acetate was added to the pulverized product to conduct neutralization, whereby a PVA in a swollen state. To the swollen PVA was added 6 times its mass of methanol (bath ratio 6 times), the mixture was held for 1 hour under reflux to make washing, and the resulting PVA was filtered and dried at 65° C. for 16 hours to obtain a PVA containing the sodium 2-acrylamido-2-methylpropanesulfonate unit in a proportion of 4% by mol, which PVA had a viscosity as a 4% aqueous solution of 13.6 mPa·s (20° C.), a polymerization degree of 1,000 and a saponification degree of 99.2% by mol.

Synthetic Example b of a Saponified Product of a Copolymer Between Vinyl Acetate and Sodium 2-acrylamido-2-methylpropanesulfonate In a 6-L separable flask equipped with a stirrer, a temperature sensor, a dropping funnel and a reflux condenser were put 2340 g of vinyl acetate, 640 g of methanol and 25.7 g of a 25% by mass methanol solution of sodium 2-acrylamido-2-methylpropanesulfonate, the inside atmosphere of the flask was replaced with nitrogen under stirring and the internal temperature was raised to 60° C. To this system was added 20 g of methanol containing 1.2 g of 2,2'-azobisisobutyronitrile whereby polymerization reaction was initiated. The polymerization reaction was conducted for 2.5 hours while 193.2 g of a 25% by mass methanol solution of sodium 2-acrylamido-2-methylpropanesulfonate was added from the time of polymerization initiation, and, at that point of time, the polymerization reaction was terminated. The solid concentration in the system at the time of the termination of polymerization reaction was 31.0% by mass. Then, the unreacted vinyl acetate monomer was repelled by introducing methanol vapor into the system to obtain a methanol solution containing a vinyl ester copolymer in a concentration of 35% by mass.

Methanol and a 10% by mass methanol solution of sodium hydroxide were added in this order to the 35% by mass methanol solution of the vinyl ester copolymer under stirring so that the mol ratio of sodium hydroxide to the vinyl acetate unit of the copolymer could be 0.025 and the solid concentration of the vinyl ester copolymer could be 20% by mass, and saponification reaction was initiated at 40° C.

Immediately after a gelled product was formed in proportion to progress of saponification reaction, the gelled product was taken out from the system and pulverized, and at a lapse of one hour after the gelled product was formed, methyl acetate was added to the pulverized product to conduct neutralization, whereby a PVA in a swollen state. To the swollen PVA was added 6 times its mass of methanol (bath ratio 6 times), the mixture was held for 1 hour under reflux to make washing, the resulting PVA was filtered and dried at 65° C. for 16 hours to obtain a PVA containing the sodium 2-acrylamido-2-methylpropanesulfonate unit in a proportion of 2% by mol, which PVA had a viscosity as a 4% aqueous solution of 33.1 mPa·s (20° C.), a polymerization degree of 1,900 and a saponification degree of 99.2% by mol.

(2) Preparation of Polymer Electrolyte Membranes

Example 1

Preparation Example 1 of a Polymer Electrolyte Membrane

The aqueous block copolymer solution obtained in Synthetic example A was diluted with water so that its solid concentration became 4% by mass, cast on a PET film and dried at room temperature to obtain a membrane of 50 μm thickness. The membrane was heat treated at 120° C. for 30 minutes using a hot air dryer. The resulting heat treated membrane was cut out into the shape of a square with a side of 15 cm, the cut out membrane was immersed in a 0.5% by mol/liter methanol solution of hydrogen chloride containing glutaraldehyde in a concentration of 4% by volume, at 20° C. for 24 hours, taken out, immersed in distilled water at 20° C. for 24 hours to make washing, and dried at 20° C.

Example 2

Preparation Example 2 of a Polymer Electrolyte Membrane

A polymer electrolyte membrane was obtained in the same manner as in Preparation example 1 of a polymer electrolyte membrane except that the aqueous block copolymer solution obtained in Synthetic example B was used.

Example 3

Preparation Example 3 of a Polymer Electrolyte Membrane

A polymer electrolyte membrane was obtained in the same manner as in Preparation example 1 of a polymer electrolyte membrane except that the aqueous block copolymer solution obtained in Synthetic example C was used.

Example 4

Preparation Example 4 of a Polymer Electrolyte Membrane

A polymer electrolyte membrane was obtained in the same manner as in Preparation example 1 of a polymer electrolyte membrane except that the aqueous block copolymer solution obtained in Synthetic example E was used.

Example 5

Preparation Example 5 of a Polymer Electrolyte Membrane

A polymer electrolyte membrane was obtained in the same manner as in Preparation example 1 of a polymer electrolyte membrane except that the aqueous block copolymer solution obtained in Synthetic example F was used.

Example 6

Preparation Example 6 of a Polymer Electrolyte Membrane (Blend Membrane)

An aqueous solution of PVA-117 (made by KURARAY CO., LTD., polymerization degree 1750, saponification degree 98.5% by mol) having a solid concentration of 4% was mixed, in equal volumes, with a solution obtained by diluting the aqueous block copolymer solution obtained in Synthetic example A with water so that its solid concentration could be 4% by mass to prepare a mixed solution. The mixed solution was cast on a PET film and then treated as in Preparation example 1 of a polymer electrolyte membrane to obtain a polymer electrolyte membrane (blend membrane).

Example 7

Preparation Example 7 of a Polymer Electrolyte Membrane (Blend Membrane)

A polymer electrolyte membrane (blend membrane) was obtained in the same manner as in Preparation example 6 of a polymer electrolyte membrane except that an ethylene-copolymerized PVA having an ethylene-modified amount of 5% by mol, a polymerization degree of 1,700 and a saponification degree of 98.5% by mol was used in place of PVA-117.

Example 8

Preparation Example 8 of a Polymer Electrolyte Membrane (Blend Membrane)

A polymer electrolyte membrane (blend membrane) was obtained in the same manner as in Preparation example 6 of a polymer electrolyte membrane except that the aqueous block copolymer solution obtained in Synthetic example B was used.

Example 9

Preparation Example 9 of a Polymer Electrolyte Membrane (Blend Membrane)

A polymer electrolyte membrane (blend membrane) was obtained in the same manner as in Preparation example 7 of a polymer electrolyte membrane except that the aqueous block copolymer solution obtained in Synthetic example B was used.

Example 10

Preparation Example 10 of a Polymer Electrolyte Membrane (Blend Membrane)

93 parts of an aqueous solution of PVA-117 (made by KURARAY CO., LTD., polymerization degree 1,750, saponification degree 98.5% by mol) having a solid concentration of 4% was mixed, in equal volumes, with 7 parts of a solution obtained by diluting the aqueous block copolymer solution obtained in Synthetic example D, with water so that its solid concentration could be 4% by mass to prepare a mixed solution. The mixed solution was cast on a PET film and then treated as in Preparation example 1 of a polymer electrolyte membrane to obtain a polymer electrolyte membrane (blend membrane).

Example 11

Preparation Example 11 of a Polymer Electrolyte Membrane (Blend Membrane)

A polymer electrolyte membrane (blend membrane) was obtained in the same manner as in Preparation example 10 of a polymer electrolyte membrane except that an ethylene-copolymerized PVA having an ethylene-modified amount of 5% by mol, a polymerization degree of 1,700 and a saponification degree of 98.5% by mol was used in place of PVA-117.

Comparative Example 1

Nafion film (Nafion 112) made by DuPont Co. was selected as a perfluorocarbonsulfonic acid polymer electrolyte membrane. Its membrane thickness was 50 μm.

Comparative Example 2

Nafion film (Nafion 117) made by DuPont Co. was selected as a perfluorocarbonsulfonic acid polymer electrolyte membrane. Its membrane thickness was 175 μm.

Comparative Example 3

Comparative Preparation Example 1 of a Polymer Electrolyte Membrane

A polymer electrolyte membrane was obtained in the same manner as in Preparation example 1 of a polymer electrolyte membrane except that the PVA obtained in Synthetic example a of a saponified product of a copolymer between vinyl acetate and sodium 2-acrylamido-2-methylpropanesulfonate was used.

Comparative Example 4

Comparative Preparation Example 2 of a Polymer Electrolyte Membrane

A polymer electrolyte membrane was obtained in the same manner as in Preparation example 1 of a polymer electrolyte membrane except that the PVA obtained in Synthetic example b of a saponified product of a copolymer between vinyl acetate and sodium 2-acrylamido-2-methylpropanesulfonate was used.

(3) Performance Tests on Polymer Electrolyte Membranes of Examples and Comparative Examples and the Results The polymer electrolyte membrane prepared from the sulfonated block copolymer obtained in each example or comparative example or a Nafion membrane was used as the sample in the following tests of 1) to 5).

1) Measurement of Electric Resistance of a Membrane

A sample of 1 cm×4 cm was put between a pair of platinum electrodes, and the composite was set in an open-air cell. The resulting open-air cell was placed in a constant temperature and constant humidity chamber whose inside temperature and relative humidity were adjusted to 60° C. and 90%, respectively, and the electric resistance of the membrane was measured by an alternating current impedance method.

2) Measurement of Linear Expansion Coefficient of a Membrane in Water

A sample of 5 cm×5 cm was immersed in pure water of 25° C., the length of the swollen film after 24 hours was measured and its linear expansion coefficient was calculated from the following equation.

Linear expansion coefficient=[(Length of the film after swelling−Length of the film before swelling)/Length of the film before swelling]×100

3) Measurement of Methanol Permeation Rate of Membrane

A methanol permeation rate was calculated by setting an electrolyte membrane in the center of an H-type cell, putting 55 ml of a 3 M (mol/liter) aqueous methanol solution in one of the resulting two spaces and 55 ml of pure water in the other space, stirring both liquids at 25° C. and measuring the amount of methanol diffusing through the electrolyte membrane into the pure water using gas chromatography (the area of the electrolyte membrane 4.5 cm²).

The electric resistances, linear expansion coefficients in water and methanol permeation rates of the membranes in Examples and Comparative examples are shown in Table 1.

As to the membranes of Comparative example 3 and Comparative example 4, deformation (winding of the membrane) due to swelling in water was furious.

TABLE 1

| | Electric resistance of membrane (90%, 60° C.) ($\Omega/cm^2$) | Linear expansion coefficient in water (%) | 3M methanol permeation rate [$\mu mol/(cm^2 \cdot min)$] |
|---|---|---|---|
| Example 1 | 0.061 | 15 | 21 |
| Example 2 | 0.055 | 18 | 20 |
| Example 3 | 0.190 | 9 | 5 |
| Example 4 | 0.064 | 14 | 19 |
| Example 5 | 0.058 | 17 | 18 |
| Example 6 | 0.119 | 12 | 3 |
| Example 7 | 0.185 | 11 | 3 |
| Example 8 | 0.125 | 12 | 6 |
| Example 9 | 0.156 | 11 | 5 |
| Example 10 | 0.278 | 6 | 3 |
| Example 11 | 0.385 | 5 | 2 |
| Com. exam. 1 | 0.042 | 8 | 45 |
| Com. exam. 2 | 0.213 | 10 | 18 |
| Com. exam. 3 | 0.833 | 10 | 3 |
| Com. exam. 4 | 1.250 | 8 | 2 |

Important performances as an electrolyte membrane for polymer electrolyte fuel cells using hydrogen as a fuel is that it displays high ion conductivity and, at the same time, it exhibits only a little swelling and deformation in water. The novel polyvinyl alcoholic polymer electrolyte membranes of the invention exhibited as high ion conductivity as that of Nafion as a typical example of usual electrolyte membranes for fuel cells, and, nevertheless, swelling in water had been inhibited, as apparent from Table 1. The electrolyte membrane of the invention can preferably be used, particularly as an electrolyte membrane for fuel cells directly using a fuel such as methanol. Namely, as apparent from Table 1, the electrolyte membranes of the invention have an excellent performance of holding high ion conductivity and having higher fuel barrier properties (lower permeability and lower leak) compared to Nafion as a typical example of usual electrolyte membranes.

The invention claimed is:

1. A polymer electrolyte membrane comprising as a main ingredient a block copolymer (P) that has been subjected to cross-linking treatment, wherein:
    the block copolymer (P) comprises, as its constituents, a vinyl alcoholic polymer block (A) and a polymer block (B) having ion-conducting groups; and
    the block copolymer (P) is:
    a block polymer represented by the following general formula (I)

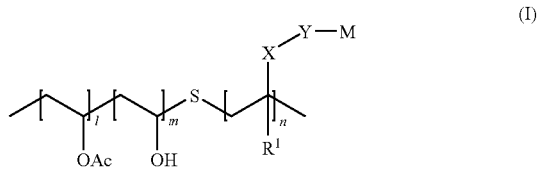

wherein polymer block (A) comprises monomer repeating units l and m, the relation between l and m is m/(l+m)≧0.80, polymer block (B) comprises monomer repeating units n, the relation among l, m and n is 0.01≦n/(l+m+n)≦R¹ represents a hydrogen atom or a methyl group, X represents a phenylene group or naphthylene group respectively optionally substituted with a methyl group, Y represents a sulfonyloxy group, a phosphonyloxy group or a carbonyloxy group and M represents a hydrogen atom, an ammonium ion or an alkali metal ion; or a block copolymer represented by the following general formula (II)

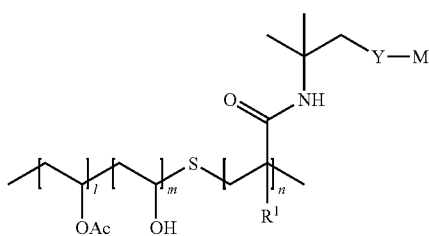

wherein polymer block (A) comprises monomer repeating units l and m, the relation between l and m is $m/(l+m) \geqq 0.80$, polymer block (B) comprises monomer repeating units n, the relation among l, m and n is $0.01 \leqq n/(l+m+n) \leqq 0.50$, $R^1$ represents a hydrogen atom or a methyl group, Y represents a sulfonyloxy group, a phosphonyloxy group or a carbonyloxy group and M represents a hydrogen atom, an ammonium ion or an alkali metal ion.

2. A polymer electrolyte membrane comprising as a main ingredient a mixture of block copolymer (P) according to claim 1 with a vinyl alcoholic polymer (Q) having a polymerization degree of 200 to 8,000 and a saponification degree of 80% by mol or more, in which mixture, the proportion of both as a mass ratio is $(P)/(Q) \geqq 3/97$, and which mixture is cross-linking treated.

3. The polymer electrolyte membrane according to claim 1 which has an ion exchange capacity of 0.30 meq/g or more.

4. A process for preparation of the polymer electrolyte membrane according to claim 1 which comprises heat treating at a temperature of 100° C. or more a membrane obtained from a solution of block copolymer (P) or a solution of a mixture of block copolymer (P) with vinyl alcoholic polymer (Q), subjecting the resulting membrane to a cross-linking treatment with a dialdehyde compound under an acidic condition in water, an alcohol or a mixed solvent thereof, and then water washing treating the resulting membrane.

5. A membrane-electrode assembly using the polymer electrolyte membrane according to claim 1.

6. A polymer electrolyte fuel cell using the membrane-electrode assembly according to claim 5.

* * * * *